Aug. 8, 1950  G. H. HUFFERD ET AL  2,517,669
HOSE END
Filed June 28, 1946  3 Sheets-Sheet 1
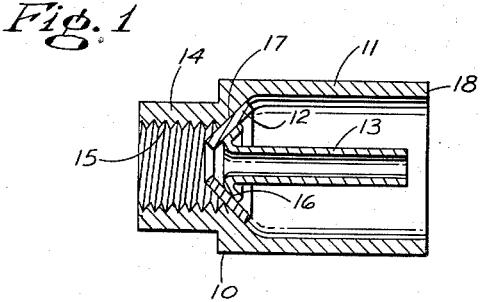
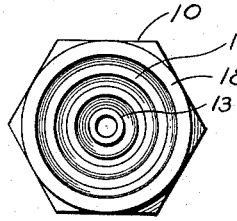
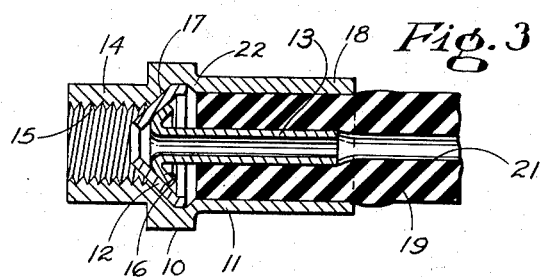
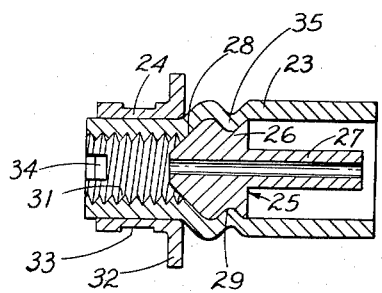
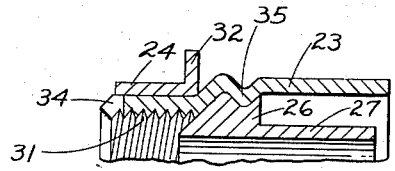
INVENTORS.
GEORGE H. HUFFERD
and CHARLES H. CRAWLEY
BY
Risley + Watts
ATTORNEYS Aug. 8, 1950         G. H. HUFFERD ET AL         2,517,669
HOSE END
Filed June 28, 1946                          3 Sheets-Sheet 2
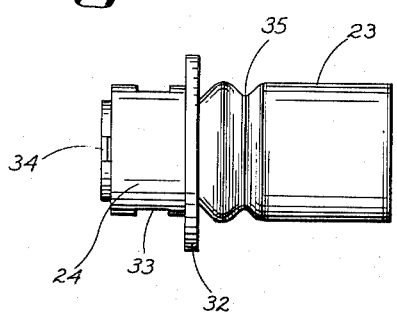
Fig. 6
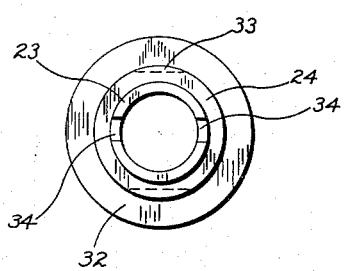
Fig. 7
Fig. 8
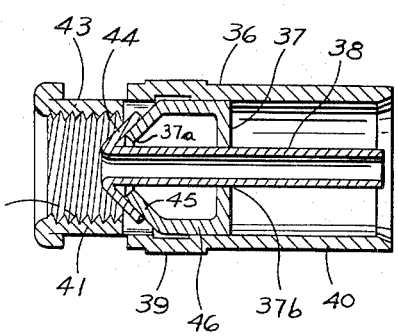
Fig. 9
Fig. 10
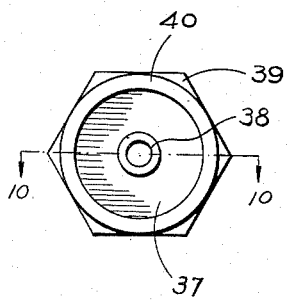
Fig. 11
INVENTORS
GEORGE H. HUFFERD
and CHARLES H. CRAWLEY
BY Richey & Watts
ATTORNEYS Aug. 8, 1950  G. H. HUFFERD ET AL  2,517,669
HOSE END Filed June 28, 1946  3 Sheets-Sheet 3

INVENTORS.
GEORGE H. HUFFERD
and CHARLES H. CRAWLEY
BY
Richey & Watts
ATTORNEYS

Patented Aug. 8, 1950

2,517,669

UNITED STATES PATENT OFFICE 2,517,669

HOSE END

George H. Hufferd, Shaker Heights, and Charles H. Crawley, Cleveland, Ohio, assignors to The Weatherhead Company, Cleveland, Ohio, a corporation of Ohio Application June 28, 1946, Serial No. 680,164

3 Claims. (Cl. 285—84)

Our invention relates to tubular connectors and has for its principal object the provision of improved, simplified hose couplings and methods of making them.

An object of the invention is to fabricate hose couplings which are light in weight, inexpensive and easy to manufacture and which will seal the pressure normally encountered in use on automotive brakes.

A further object of the invention is to fabricate such hose couplings from stampings produced on punch presses and eyelet machines.

Other and further objects, features and advantages of the invention will become apparent as the description proceeds.

A better understanding of the invention will be afforded by the following detailed description considered in conjunction with the accompanying drawing, in which Fig. 1 is a longitudinal, medial, sectional view of a hose coupling prior to assembly with a hose;

Fig. 2 is an end view of the apparatus of Fig. 1;

Fig. 3 is a longitudinal, medial view of the end portion of a hose with which the coupling of Fig. 1 has been assembled;

Fig. 4 is a view of a longitudinal, medial section through a modified form of hose coupling;

Fig. 5 is a view of a longitudinal, medial section cut by a plane perpendicular to the section shown in Fig. 4;

Fig. 6 is a side view of the apparatus of Figs. 4 and 5, corresponding in viewpoint to Fig. 4;

Fig. 7 is an end view of the apparatus of Figs. 4 to 6;

Fig. 8 is a longitudinal, medial, sectional view of a blank employed in the production of the apparatus of Figs. 6 to 7;

Fig. 9 is a side elevation of a modified form of hose coupling;

Fig. 10 is a view of a longitudinal, medial section of the apparatus of Fig. 9, represented as cut by a plane perpendicular to the plane of the paper as represented in Fig. 9;

Fig. 11 is an end view of the apparatus of Figs. 9 and 10;

Like reference characters are utilized throughout the drawing to designate like parts.

Figure 12:
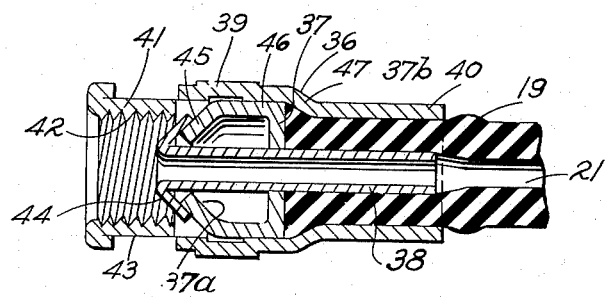
Fig. 12 is a longitudinal, medial, sectional view of the end portion of a hose assembled with a hose coupling of the type illustrated in Figs. 9 to 11.

As shown by the drawings our hose coupling is assembled from stampings or parts which may be produced rapidly at little expense on punch press or eyelet machines so as to avoid the necessity for use of relatively more expensive parts manufactured on screw machines. Referring first to Figs. 1, 2 and 3 of the drawings, we assemble a hose coupling from component parts consisting of stampings, including a tubular member or body 11, a body insert 12 and a tube insert or standpipe 13. The tubular member 11 is a piece drawn from tubing and formed to the shape shown in a punch press with an hexagonal-outline wrench-engaging middle portion 10 and a reduced diameter portion 14, which has been thickened by the punching operation to provide adequate strength for cutting internal threads 15. The body insert 12 consists of a stamping in a shape of a washer pressed to the form of a truncated cone. The tube insert 13 consists of a piece formed in an eyelet machine with an inverted-flare portion 16 lying along a conical surface.

Preferably the tubular member 11 is formed with a conical surface 17 to form a seat and the insert 12, as well as the conical flare 16, are formed to lie along the same conical surface. The tube insert or standpipe 13 is mounted so as to project from the body insert 17 and form a body insert assembly. Preferably the parts 12 and 13 are joined by some suitable fusion process such as hard soldering, brazing or welding.

The right-hand end portion 18 of the tubular member 11 is adapted to receive and surround the end portion of a length of hose 19 composed of compressible resilient material such as rubber or synthetic composition, which may be reinforced with fiber or metallic strands, and the standpipe 13 is adapted to fit within a bore 21 of the hose 19. In assembling the hose coupling with the hose 19 the standpipe 13 is inserted in the bore 21 of the hose 19 and the insert assembly consisting of the parts 12 and 13 is coaxially placed within the tubular member 18 with the frustroconical part 12 brought against the seat 17 so as to form a seal, the hose 19 being thrust inward so that the tubular-member portion 18 surrounds the outer surface of the hose. The hose-receiving portion 18 of the tubular member 11 is then swaged or inwardly compressed as illustrated in Fig. 3. In this manner a locking shoulder 22 is formed which confines the outer edges of the body insert 12 so as to secure it in position. The resultant compression of the hose 19 also secures the hose in position between the members 13 and 18.

If desired, the parts of the body insert assembly may be integral and the tubular member or body may be fabricated from component parts as illustrated in Fig. 4. In this case we provide a tubular member 23 to which a reinforcing collar 24 is attached and we provide a body insert 25, the parts of which are integral. The body insert 25 comprises a plug portion 26 from which projects a standpipe or a hose insert 27 integral with the portion 26. The body insert 25 may be provided with a conical seat portion 28 and preferably has an annular groove 29.

The tubular member 23 may be provided with an internal thread 31, as illustrated for connection with a pipe fitting or the like, to which a hose is to be connected. In order to avoid the necessity for thickening the threaded portion 31 of the tubular member 23, the collar 24 is provided, surrounding the threaded end of the tubular member 23 and preferably secured thereto in any suitable manner as by some fusion process such as hard soldering, or welding. The collar 24 may be provided with a flange 32 to protect the hose end and preferably flats 33 are provided to facilitate securement of the hose end to a supporting bracket or the like, not shown. A transverse slot 34 may be cut in the threaded end portion of the tubular member 23 to receive a wrench or other tool for rotating the tubular member 23 to the desired position during assembly operations.

The tubular member 23 is assembled to the body insert 25 by inwardly crimping or swaging the portion 35 of the tubular member 23 to form a rib fitting in the annular groove 29.

A hose coupling, illustrated in Figs. 9 to 12, comprises a tubular member 36, a bushing 37 and a hose insert 38, all of which component parts comprise stampings formed from sheet or tube stock. The tubular member 36 is preferably formed with a middle portion 39 having a wrench-receiving flat surface, preferably in the form of a hexagon, as illustrated. There is a hose-receiving end portion 40. The opposite end portion 41 is inwardly folded to provide a reinforced wall, in which a screw thread 42 may be cut. Preferably two side portions 43 of the outer surface are cut away in order to provide flats for assembly with supporting brackets, not shown.

The bushing 37 comprises a hollow piece in a form of a combined cylinder and truncated cone, the cylindrical portion of which fits within the hose-receiving portion 40 of the tubular member 36. Circular openings 37a and 37b are provided in the bushing 37 fitting the outer surface of the hose insert 38 whereby the hose insert 38 is coaxially supported within the tubular member 36. Preferably the hose insert 38 is provided with a mushroomed head in the form of an inverted flare 44 at the inner end, the inner surface of which lies along the same conical surface as the frusto-conical portion 45 of the bushing 37. Preferably also the frustro-conical portions 44 and 45 are joined by a suitable fusion process, such as hard soldering or welding, so as to produce a unitary insert assembly comprising the parts 38 and 37.

Preferably the outside diameter 46 of the bushing 37 is slightly greater than the inside diameter of the body portion 40 so that a light press fit holds the parts together prior to assembly of the hose coupling with the hose. As illustrated in Fig. 12, the assembly of the hose 19 to the fitting is accomplished by swaging or crimping the portion 40 of the tubular member 36 to secure the hose firmly by compression between the inner wall 40 and the standpipe 38. This operation results in a shoulder 47 which serves to hold bushing 37 in place.

Figure 13:
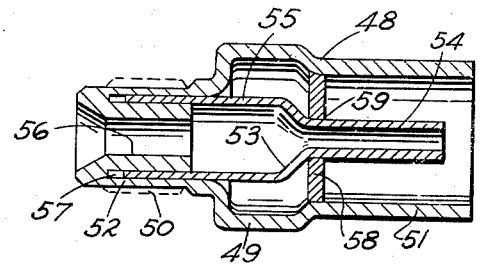
Fig. 13 is a longitudinal, medial, sectional view of a modified form of hose coupling employing a one-piece drawn insert.
Figure 14:
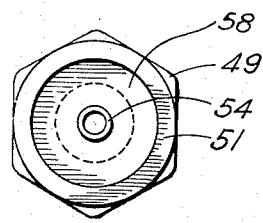
Fig. 14 is an end view of the apparatus of Fig. 13.
Figure 15:
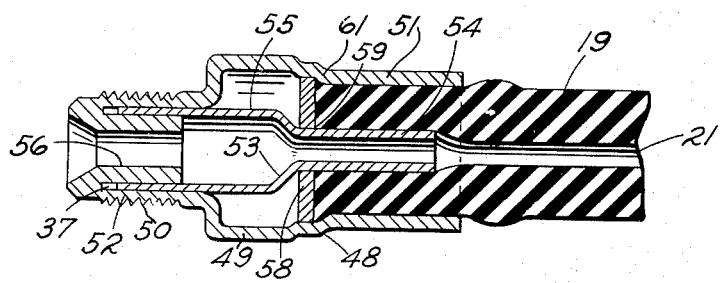
Fig. 15 is a longitudinal, medial, sectional view of the end portion of a hose with which a hose coupling of the type illustrated in Figs. 13 and 14 has been assembled.

The form of hose coupling illustrated in Figs. 13, 14 and 15 also comprises component parts produced on punch presses or eyelet machines. There is a tubular member 48 comprising a stamping formed with external wrench-engaging flats or a hexagon contour 49, a hose-receiving portion 51, and a threaded end 52; and there is a hose insert 53. The hose insert 53 is drawn from tubing and preferably formed with two different diameter portions 54 and 55. The smaller diameter portion 54 is adapted to be inserted in the bore 21 of the hose 19 and the larger diameter portion 55 is adapted to fit within the threaded end portion 52 of the tubular member 48. In the form of hose coupling illustrated in Fig. 13, the outer surface 50 of the coupling, rather than the inner surface, is threaded; however, our invention is not limited to one arrangement or the other. Preferably the connecting end 52 of the coupling 48 is inwardly folded with a re-entrant wall 56 to form an annular slot 57, adapted to receive the larger diameter portion 55 of the insert 53. For further supporting and centering the insert 53 within the tubular member 48 a circular stamping or washer 58 may be provided having an opening 59 fitting the smaller diameter portion 54 of the insert 53 and an outer diameter fitting the inner surface of the hose-receiving portion 51 of the tubular member 48.

In assembling the parts of the hose coupling illustrated in Figs. 13, 14 and 15, the hose-receiving portion 51 is inwardly swaged to form a shoulder 61, as illustrated in Fig. 15, locking the washer 58, in place which in turn locks the tubular insert 53 in place. Compression of the hose 19 also insures its being secured tightly between the members 51 and 54.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention which is defined in the appended claims.

What we claim is:

1. A hose-coupling comprising in combination a tubular member internally threaded at one end to receive a male fitting member and adapted to receive and surround the end of a hose at the other end, and having a conical seat formed therein at the threaded end, a body insert comprising a truncated conical sheet-metal stamping fitted against said conical seat, and a standpipe, fusion-joined to said body insert and adapted to be inserted in a hose, said tubular member having the hose-receiving portion thereof swaged to secure said body insert.

2. A hose-coupling comprising in combination a tubular member, threaded at one end and adapted at the other end to receive and surround a length of hose, body-insert bushing comprising a hollow cylindrical stamping frusto-conical at one end, said tubular member being swaged to secure said body insert, and a tubular standpipe adapted to be inserted in a hose extending through said bushing, said standpipe having a concave mushroomed frustro-conical head, sealed against the frustro-conical surface of said bushing.

3. A hose coupling comprising in combination a tubular member internally threaded at one end and adapted to receive and surround the end of a hose at the other end, a body insert comprising a sheet metal stamping having a truncated conical wall said insert being disposed within said tubular member with the convex side of the wall facing said threads, and a sheet metal standpipe having a tubular hose insert portion disposed within said other end of the tubular member, said standpipe having a frustro-conical head with a surface complementary to and fusion joined with the conical wall of said insert.

GEORGE H. HUFFERD.
CHARLES H. CRAWLEY.

REFERENCES CITED

The following references are of record in the file of this patent:

UNITED STATES PATENTS

| Number | Name | Date |
|---|---|---|
| 1,699,541 | Murray | Jan. 22, 1929 |
| 2,008,650 | Weatherhead | July 16, 1935 |
| 2,028,316 | Brunner | Jan. 21, 1936 |
| 2,040,834 | Cowles | May 19, 1936 |
| 2,273,398 | Couty | Feb. 17, 1942 |
| 2,399,790 | Conroy | May 7, 1946 |